United States Patent [19]

Robertson

[11] Patent Number: 5,226,255

[45] Date of Patent: Jul. 13, 1993

[54] PLANT MAT AND METHOD

[75] Inventor: David W. Robertson, Anaheim, Calif.

[73] Assignee: Grass Ventures, Ltd., Laguna Beach, Calif.

[21] Appl. No.: 618,293

[22] Filed: Nov. 27, 1990

[51] Int. Cl.⁵ ............................................. A01G 31/00
[52] U.S. Cl. ........................................................ 47/56
[58] Field of Search ................................. 47/56, 9, 95

[56] References Cited

U.S. PATENT DOCUMENTS

| | | |
|---|---|---|
| 1,971,504 | 8/1934 | Pratt . |
| 2,309,792 | 2/1943 | Kirschenbaum . |
| 2,826,865 | 3/1958 | Chohamin . |
| 2,876,588 | 3/1959 | Tietz et al. . |
| 2,923,093 | 2/1960 | Allen . |
| 3,845,584 | 11/1974 | Mercer . |
| 3,870,583 | 3/1975 | Gidge . |
| 3,889,417 | 6/1975 | Wood . |
| 4,062,145 | 12/1977 | Gidge . |
| 4,090,325 | 5/1978 | Mushin et al. ............. 47/95 |
| 4,175,496 | 11/1979 | Rehbein ..................... 47/56 |
| 4,190,981 | 3/1980 | Muldner . |
| 4,219,600 | 8/1980 | Surowitz et al. ........... 47/95 |
| 4,272,919 | 6/1981 | Schmidt . |
| 4,283,880 | 8/1981 | Fjeldsa ....................... 47/95 |
| 4,309,844 | 1/1982 | King et al. . |
| 4,318,248 | 3/1982 | Muldner . |
| 4,364,197 | 12/1982 | Baron . |
| 4,819,372 | 4/1989 | Schürholz ................... 47/95 |
| 5,009,031 | 4/1991 | Knop et al. ................. 47/95 |

FOREIGN PATENT DOCUMENTS

| | | |
|---|---|---|
| 1126663 | 3/1962 | Fed. Rep. of Germany . |
| 2236288 | 2/1973 | Fed. Rep. of Germany ......... 47/56 |
| 2150770 | 4/1973 | Fed. Rep. of Germany . |
| 2358931 | 6/1974 | Fed. Rep. of Germany ......... 47/56 |
| 2444436 | 3/1976 | Fed. Rep. of Germany . |
| 1-320909 | 12/1989 | Japan ............................ 47/56 |
| 2003013 | 3/1979 | United Kingdom . |

OTHER PUBLICATIONS

Troyturf American Nurseryman vol. 115 #6, p. 93, Mar. 15, 1962.
American Nurseryman, vol. 115, No. 6, p. 93, 1962.

Primary Examiner—Carl D. Friedman
Assistant Examiner—Michele A. Van Patten
Attorney, Agent, or Firm—Mason, Fenwick & Lawrence

[57] ABSTRACT

A mat for plant cultivation comprises upper and lower portions of non-woven fibers, substantially all of which are preferably natural, biodegradable fiber; an intermediate layer of bi-laterally stable plastic mesh, of high strength relative to the non-woven fiber layers, is structurally joined to the fiber portions, as by needling. The mat includes seed, and may include fertilizer and/or water absorbing material.

A method of soil improvement comprises providing a mat having upper and lower portions of non-woven fibers, substantially all of which are natural, biodegradable fibers, with an intermediate bi-laterally stable plastic mesh layer structurally joined to the non-woven fibers. The mat is placed on the ground, such as a bare hill, for initially diminishing soil erosion by water runoff, the mat being optionally seeded after placement. The mat provided may be placed on poor soil, and after plant growth, the plants and mat may be plowed under, optionally in a repetitive cycle, to improve the soil.

7 Claims, 3 Drawing Sheets

PLANT MAT AND METHOD

BACKGROUND OF THE INVENTION

The present invention relates to a mat for the cultivation of plants, and to a method of improving soil as by controlling soil erosion with a mat.

It has been recognized that the growth of plants, such as grass, may be enhanced by the provision of mats which comprise support medium for seeds, and which are placed upon the ground. These mats, either before or after placement on the ground, are provided with seeds, which may be watered, fertilized, etc., so as to promote the rapid germination of the seeds and rapid plant growth.

Among the proposals which have been made for mats of this type is Allen U.S. Pat. No. 2,923,093, which provides a seed planting mat having a bottom layer of loosely matted fibers to form a porous foundation, the fibers being either interwoven or unwoven; on top of this layer is a layer of growing media, containing fertilizers, mulch, and seeds, and this layer is covered with a cover layer of loose fibers matted together and which may be either natural fibers, synthetic, plastic, or glass wool. The three layers are felted together, and the resulting mat is capable of being stored and transported, and then applied to a field for plant growth. The resulting mat is of lesser strength than is desirable, due to the structural layer being laterally unstable under loads imposed during handling and placement.

Gidge U.S. Pat. No. 4,062,145 discloses a mulch mat or carpet in which a woven plastic mesh layer is provided between upper and lower layers formed of ground bark particles unified and individually encapsulated in a resin binder. The woven mesh is not dimensionally stable.

Muldner U.S. Pat. No. 4,190,981 and Muldner United Kingdom Application 203,301 provide a mat for growing lawns including a lower base sheet comprising a biodegradable web, a bed of seeds and dried compressed peat particles thereon adhesively secured to the base sheet, and an upper layer or veil of unwoven web material adhesively secured to the bed. Muldner U.S. Pat. No. 4,318,248 provides a mat of this type in which there are provided a lower base sheet of biodegradable we material, and a seed bed thereon including seeds, dehydrated gel material and dried peat particles, the seed bed secured to the base sheet, and an upper veil of non-woven porous web material. These mats are deficient in that they are not as strong as desirable, for handling and transporting and are also dimensionally unstable.

Mercer U.S. Pat. No. 3,845,584 provides a method of growing grasses in which there is provided a net or mesh layer which is held above and bonded to a root impermeable base, the structure being laid upon the ground, followed by the application of seed and growth medium.

German Patent 2,150,770 provides a seed carpet in which seed is provided between upper and lower layers of material.

Pratt U.S. Pat. No. 1,971,504 provides a mat having a disintegrable backing or reinforcement having thereon a water soluble fertilizer and seeds, with the seeds being adhered in position, but spaced from the fertilizer by a breaker strip of flexible material which functions to keep the acidity of the fertilizer from adversely affecting the seeds. The backing layer is preferably of cotton knitting or may be paper with reinforcing threads, and this lacks strength and structural stability.

Tietz et al U.S. Pat. No. 2,876,588 provides a grass mat including a lower layer of impervious material such as a plastic sheet, a layer of burlap on the plastic sheet, a layer of peat moss, seeds on the peat moss layer, and optionally a further layer of peat moss. A further plastic film is provided over the top, and the entire assemblage may be rolled for transportation. The mat has less strength than is required.

Surowitz et al U.S. Pat. No. 4,219,600 discloses a moisturizing mat made by depositing wood pulp fibers on a fibrous layer, then placing a second fibrous layer thereon, followed by bonding the second layer or web to the first, and then bonding an impervious plastic film to one surface of the resulting product.

Baron U.S. Pat. No. 4,364,197 provides a method of making pregrown turf in which a layer of grass seeds is sandwiched between two layers of non-woven cloth, one of which is made of flax fibers, there being optionally included polystyrene particles between the layers. The layers may be placed on a plastic sheet.

King et al U.S. Pat. No. 4,309,844 provides a mat in which a layer of seeds is provided between a pair of polyurethane foam sheets: a reinforcing net-like layer may be provided between the polyurethane foam sheets. The polyurethane sheets are adhered together by fusion from flame lamination.

The hereinabove disclosed mat structures are deficient in providing a mat for growing grass which is of relatively great strength, permitting after-fabrication handling and/or rolling for transportation and storing, and then being laid out on the ground, together with a structure which will enable water to penetrate to the seeds, and which will protect the seeds from being eaten by birds, while providing a mulch.

It has heretofore been proposed to provide various constructions of mats to the soil for preventing erosion. German patent 1,126,633 discloses the use of a sod mat, with grass already growing, for placement onto bare ground, as on a hillside. Such a mat is extremely heavy and is therefore difficult to transport and to apply.

Pratt U.S. Pat. No. 1,971,504 provides a mat which includes a base of reinforced paper or cotton netting surmounted by fertilizer, a flexible breaker strip, surmounted by seeds adhered to the breaker strip by suitable adhesive. The structure may be rolled, but lacks strength and lacks porosity, as well as permits the seeds to be exposed so that many of the seeds may be eaten by birds.

Gidge U.S. Pat. No. 4,062,145 provides a mulch carpet comprising a plastic mesh intermediate layer and upper and lower layers formed of ground bark particles encapsulated in resin binder which adheres the bark particles to each other and to the mesh. The porosity of the mat is such that plant growth is inhibited.

SUMMARY OF THE INVENTION

An improved high strength cultivation mat is provided comprising upper and lower portions of non-woven fibers, all or substantially all of which are natural, and therefore biodegradable. An intermediate, bi-laterally stable high strength mesh, of relatively large mesh size, is interposed between these non-woven layers, and structurally bonded to them, as by needling, a process which carries the ends of fibers of each portion into the other portion, such fibers passing through the mesh so that the fibers and mesh are structurally held together. The mat has plant seeds within it, and preferably also has fertilizer and water absorbing material, such as corn starch, therein; alternatively the mat may contain only fertilizer and water absorbing material.

A method is provided for soil improvement, such as for resisting soil erosion and/or for enriching the soil. The method comprises laying a mat on the soil, the mat being comprised of non-woven biodegradable fibers, and an intermediate layer of bi-laterally stable, strong mesh material structurally joined to the fibers. The mat may be without seeds, fertilizer and water absorbent material, or it may contain seeds, and also may contain fertilizer and/or water absorbing material. The mat may be provided with water after placement on the earth, to encourage seed germination and plant growth, or a mat without seeds may have seeds supplied, as by a hydro-seeding step, the mat optionally containing fertilizer and/or water absorbing material. The mat may be plowed under to improve the soil by enrichment, and this may be done on a repetitive cycle.

Among the objects of the present invention are the provision of an improved plant cultivation mat of low cost and high strength and lateral dimensional stability. Yet another object of the present invention is to provide a plant cultivation mat of low cost and high strength, and including seeds and having, in addition, provision for rapid and improved seed growth.

Yet another object of the present invention is the provision of a plant cultivation mat of superior strength, low cost and requiring minimal water consumption for seed germination and plant growth.

A further object of the present invention is the provision of a method of soil improvement utilizing a low cost and high strength mat.

Another object is to provide a method of soil improvement in which erosion control is accomplished with a low cost, high strength mat and bi-laterally stable made up substantially of biodegradable material.

A further object is to provide a method of soil improvement in which a low cost, high strength mat is utilized, and in which the growth of plants, and therefore the anchoring of the mat to the soil, is readily accomplished.

Still another object of the present invention is the provision of a method of soil improvement in which a strong, lightweight lateral dimensionally stable and readily transportable mat is laid on the soil, and in which rapid seed germination and plant growth are encouraged.

Other objects and many of the attendant advantages of the present invention will be readily understood from the following specification and claims, and by reference to the appended drawings.

DESCRIPTION OF THE PREFERRED EMBODIMENTS

Figure 1:
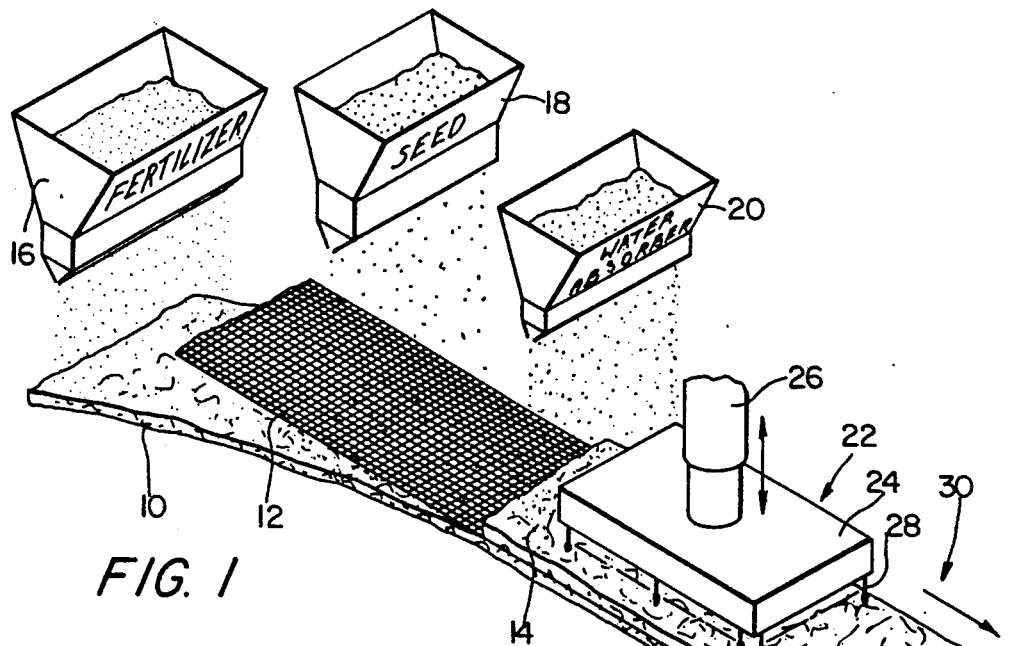
FIG. 1 is a diagrammatic illustration in perspective of an apparatus for making an improved plant cultivation mat in accordance with the present invention.

Referring now to FIG. 1, there is shown apparatus and method for making a plant cultivation mat. There is provided a first portion or body 10 moved in the direction of the arrow, and made of non-woven fibers, the fibers being preferably natural fibers which are therefore biodegradable. Among the natural fibers suitable for use in accordance with the present invention are jute fiber, palm fiber, peat, sisal, coconut fiber and wood fiber. The portion or body 10 will be understood to be made up substantially entirely of such natural fibers, although it may contain a small proportion of synthetic fibers, which may be provided in order to decrease the rate of decomposition of the resulting mat 30 when laid on the earth.

On the body 10 of fibers is an intermediate plastic mesh 12, having a mesh size of preferably one-half to three-fourths of an inch. The mesh 12 is bi-laterally stable, and preferably is of the type in which the elements of the mesh extending in one direction are anchored by cross-linking or fusion to the elements extending in the transverse direction: it may be of plastic material. The mesh 12 is of substantially greater strength than the non-woven fiber body 10, being of substantially greater tensile strength and being substantially more resilient than the body 10.

A body 14, substantially identical to the body 10, is provided on the mesh 12. Above the body 10 are a dispensing bin 16 for fertilizer F, a dispensing bin 18 for seed S, and a dispensing bin 20 for a water absorbing material WA. The order of the dispensing bins may be other than that shown, and fewer bins may be used, such as no bins, the seed bin 18, or the fertilizer bin 16 and water absorber bin 20. The water absorbing material WA is preferably corn starch or synthetic polymers, and serves to absorb water applied to it, and to the resulting plant growing mat 30, releasing moisture at a slow rate for assisting in seed germination and plant growth.

A needling or felting apparatus 22 is provided, including a plate 24, a reciprocating apparatus 26, and multiple barbed needles 28. In a known manner, the needling of felting apparatus 22 causes the ends of some of the fibers from the upper non-woven body 14 to penetrate through the mesh 12 and into the lower non-woven body 10 and to cause the ends of some of the fibers comprising the lower body 10 to pass through the mesh 12 and into the upper body 14. As a result, the fibers and the mesh 12 are structurally united, and provide a lightweight and strong plant cultivation mat which may be readily rolled for storage, stored, transported, and laid out without coming apart, and which will in addition remain in place on the ground, with anchoring as may be necessary. The mat 30 may be pulled upon at its edges as necessary for placement of it, without changing its lateral dimension due to the characteristics imparted by the mesh 12. The seeds S from the distributor bin 18 are located in the mat 30 below the top thereof, so that there is some non-woven fibers over the seeds, in order to protect them from lower temperatures, as occur usually at night, from birds which would eat those seeds which they could reach, and also protect the seeds from being washed away by water, such as rain or sprinkling.

Figure 2:
FIG. 2 is a cross-sectional view taken on the line 2—2 thereof.
Figure 2A:
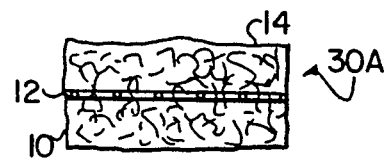
FIG. 2A is a cross-sectional view similar to FIG. 2, of a mat without seeds.

In FIG. 2A, there is a shown a mat 30A which is substantially identical to the mat 30 shown in FIG. 2, with the exception that the mat 30A contains substantially only non-woven fibers and the mesh 12, including a portion 14 above the mesh 12 and a portion 10 below the mesh 12. However, in the mat 30A, there are not provided seeds, fertilizer or water absorbing material. Such a mat is known, having been used for carpet underlayment padding.

In the known machinery for producing such carpet underlayment pads, a number of Garnetting machines are provided for serially depositing fibers in random, unwoven fashion on a conveyor, the downstream Garnetting machines laying the random fibers on the laid fibers from the Garnetting machines preceding them, the mesh being put onto a conveyed unwoven body of these fibers at an intermediate location along the length of the conveyor, that location being intermediate between initial Garnetting machine or machines and the final Garnetting machine or machines: preferably, the placement of the mesh is, for example, after the third of six Garnetting machines, so that the mesh is approximately at the intermediate level of the completed mat.

Figure 2B:
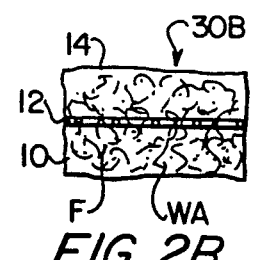
FIG. 2B is a cross-sectional view similar to FIG. 2 of a mat without seeds, but with fertilizer and water absorber.

In FIG. 2B, there is shown a mat 30B, similar to the mat 30, but without seeds S. It may be used as set forth below.

Figure 3:
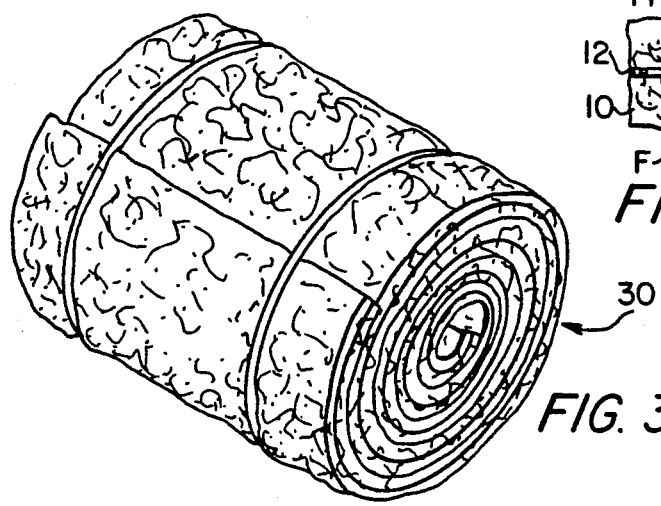
FIG. 3 is a view of a plant cultivation mat in accordance with the present invention in rolled condition for storage and transport.

FIG. 3 shows a mat 30 rolled and bound, and with a center opening into which a lifting bar or rod may be placed for lifting and moving. The mats 30A and 30B may also be rolled in this manner.

Figure 4:
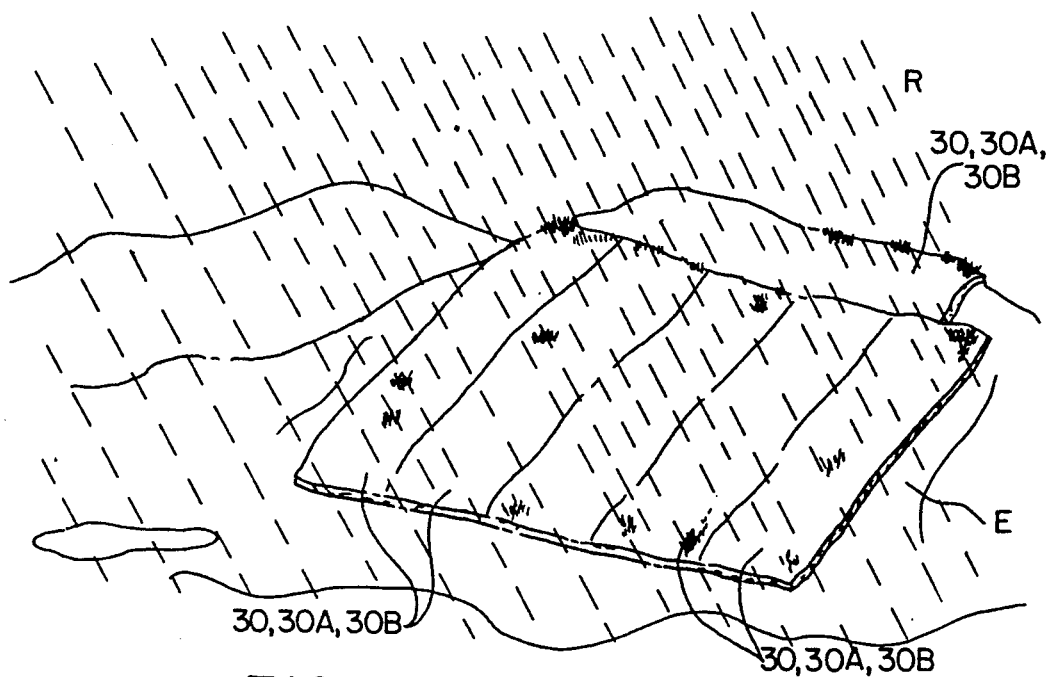
FIG. 4 is a perspective view illustrating a method in accordance with the present invention of soil improvement.

Referring to FIG. 4, there is shown a method in accordance with the present invention of utilizing mats 30, 30A and/or 30B. The mats 30, 30A and 30B are constructed as shown in FIG. 2, 2A or 2B, having upper and lower portions of non-woven fibers and an intermediate bi-laterally stable mesh 12 structurally bound to the unwoven fiber bodies above and below it.

Thus, the mats shown in FIG. 4 will have non-woven, substantially entirely natural, biodegradable fibers in contact with the earth E, shown as a barren hillside, such as often results from highway construction. In such cases, as in others, it is highly desirable that the bare hillside be protected against erosion as by rain R, which would tend to erode the earth from the hillside and, possibly, deposit the earth on the road bed or roadway. The natural fibers forming parts of the mats 30, 30A or 30B will tend to engage the earth and the fibers of the mat 30, 30A, 30B being randomly disposed, will serve as a disperser of water falling thereon to thereby diminish the force of the water and its tendency to erode the underlying earth. Resistance to erosion will be enhanced by the anchoring to the earth by individual fibers from the lower portion of the mat 30, 30A, 30B which engage the top surface of the earth. Where the mat 30 is used, water may be sprinkled on the mat, or it may be exposed to precipitation, so that moisture is provided for seed germination and plant growth. Where the mat 30A is used, it may be provided for soil improvement only, including stabilization of the soil by dispersing rain, as above noted, or it may be used on other soil configurations for receiving seed after laying on the earth.

Figure 5:
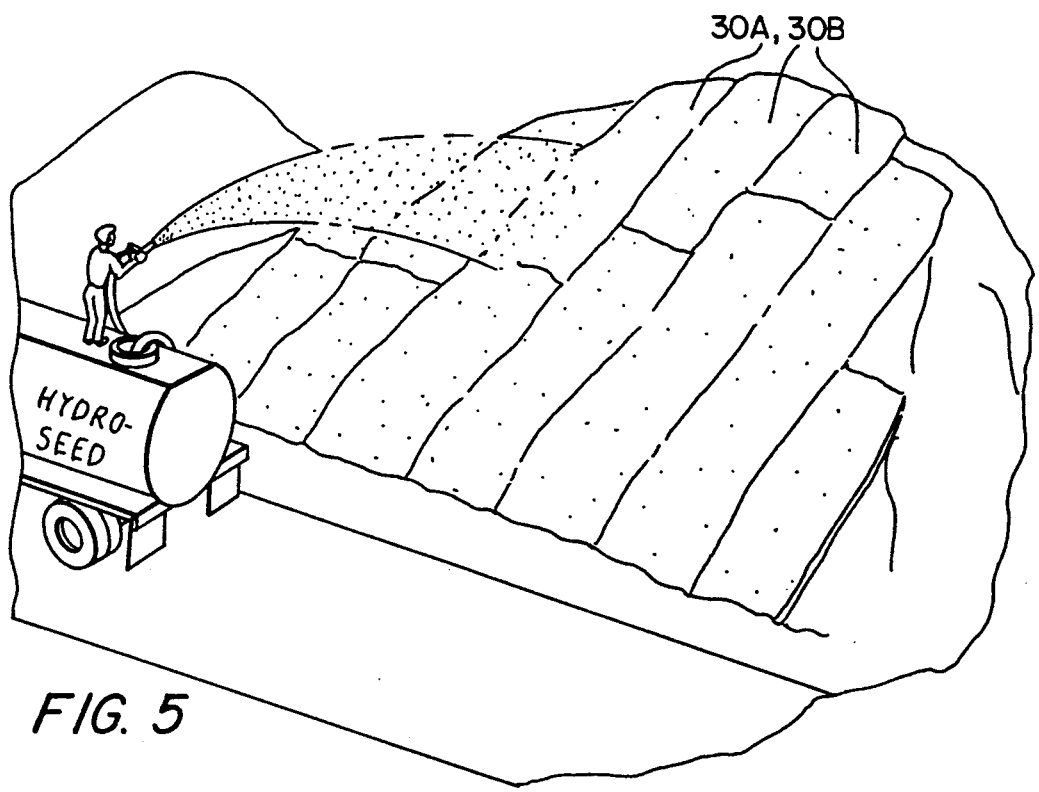
FIG. 5 is a view of an alternate method of soil improvement in accordance with the present invention.

In connection with soil protection, utilizing mats 30A or 30B, which are without seeds, a plurality of the mats 30A, 30B are shown in FIG. 5 on a hillside, and seed is applied to them by the well known hydro-seeding process in which seeds are incorporated in an aqueous body and are sprayed onto the mats. The mats 30A, 30B tend to capture the seeds, preventing them from flowing downwardly and concentrating at the bottom of the hillside, with relatively fewer of the seeds at the top. Also, the mats 30A, 30B diminish the risk of soil erosion which might be caused by the action of the liquid portion of the hydro-seeding material.

Figure 6:
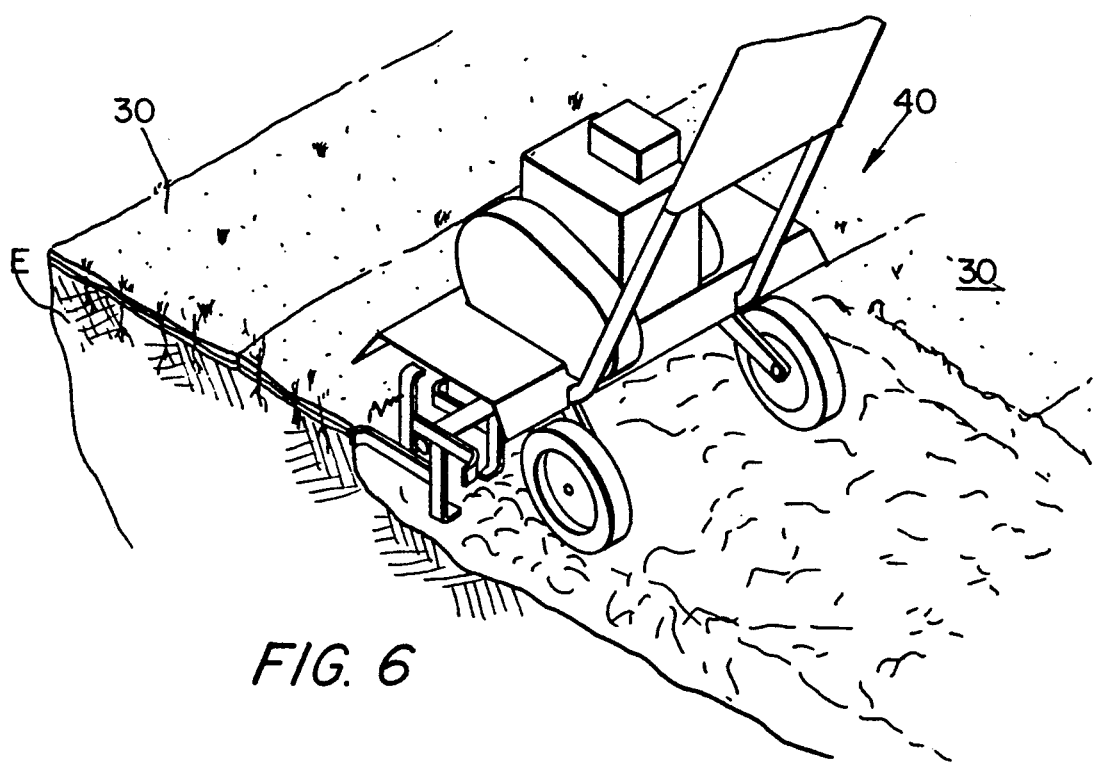
FIG. 6 is a further view illustrating a method of soil improvement in accordance with the present invention.

FIG. 6 shows earth E with mats 30 (or 30A, 30B) thereon, grass having been caused to grow, as by the application of moisture. Through utilization of the water absorbing material WA in the mats 30, 30B, relatively smaller amounts of water are required than otherwise, savings of the order of fifty per cent of the water otherwise required being effected. A machine generally designated 40 is used to plow under the residue grass crop, and any portions of the mat which remain, it being understood that over time the natural fibers of which the mat 30 is made will deteriorate. The machine 40 serves to chop the residue of the crop and the remaining mat and to incorporate it into the top layer of the earth or soil. Thus, the incorporation of the organic material from the mat and from the crop grown on or by the mat will enrich the soil. Where the crop grown on the mat is an annual crop, the step of plowing under the crop and the mat would be effected usually at the end of the growing season, and for the next growing season a further layer of mats is laid on the earth, and after growing, the plowing under is repeated. Thus, there is a repetitive cycle of mat placement, plant growing and plowing under so that the soil becomes enriched. When sufficiently enriched, the application of the mats may no longer be required.

Figure 6A:
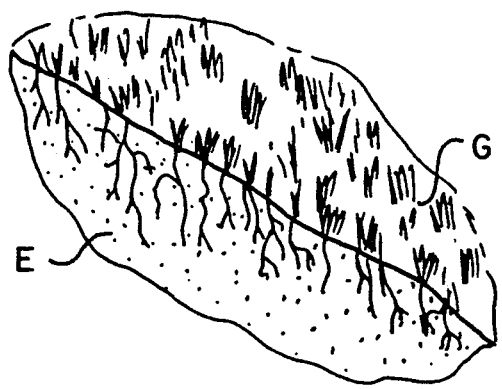
FIG. 6A is a view illustrating plant growth resulting from the method of the present invention.

In FIG. 6A, there is shown a typical crop such as grass G in the earth or soil E, with the roots of the grass G extending into the earth. As is recognized, penetration of earth by roots and their later decay tend to enrich the earth, by providing organic material. The volume of the mesh 12 will be minimal so as not to interfere with the enrichment of the soil.

The mats herein disclosed may be placed on plastic sheeting on the ground for growing sod. The mat with grass growing in it may then be removed for planting at its permanent site. The sod, having the bi-laterally stable mesh 12 as the structural member, readily withstands handling, transporting and laying, despite the weight provided by the grass.

The claims and the specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

What is claimed is:

1. A mat for growing grass or similar plants comprising:

a lower portion comprising substantially entirely non-woven biodegradable fibers, an upper portion comprising substantially entirely non-woven biodegradable fibers, and an intermediate bi-laterally stable mesh having substantially greater tensile strength than said upper and lower portions, said upper and lower portions and said mesh being structurally joined by penetration of fibers through said mesh, and plant seeds distributed within said mat.

2. The mat of claim 1, and further comprising fertilizer for said seeds in said mat.

3. The mat of claim 2, and further comprising water absorbing material in said mat.

4. The mat of claim 1, and further comprising water absorbing material in said mat.

5. The mat of claim 1, wherein said water absorbing material comprises corn starch or synthetic polymers.

6. The mat of claim 1, wherein said mesh is of plastic.

7. The mat of claim 1, wherein said mat has sufficient strength and flexibility to be rolled and unrolled.

* * * * *